United States Patent
Gehring et al.

(10) Patent No.: US 8,996,218 B2
(45) Date of Patent: Mar. 31, 2015

(54) HYBRID DRIVE CONTROL DEVICE

(75) Inventors: Ottmar Gehring, Kernen (DE); Felix Kauffmann, Stuttgart (DE); Juergen Elser, Auenwald (DE); Christophe Veber, Weinstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/113,920

(22) PCT Filed: Dec. 8, 2011

(86) PCT No.: PCT/EP2011/006160
§ 371 (c)(1),
(2), (4) Date: Dec. 5, 2013

(87) PCT Pub. No.: WO2012/146268
PCT Pub. Date: Nov. 1, 2012

(65) Prior Publication Data
US 2014/0088810 A1    Mar. 27, 2014

(30) Foreign Application Priority Data
Apr. 27, 2011  (DE) .................. 10 2011 018 769

(51) Int. Cl.
*G06F 17/00*  (2006.01)
*B60W 20/00*  (2006.01)
(Continued)

(52) U.S. Cl.
CPC ............. *B60W 20/104* (2013.01); *B60W 10/06* (2013.01); *B60W 10/08* (2013.01); *B60W 10/26* (2013.01); *B60W 20/00* (2013.01); *B60W 30/143* (2013.01); *B60W 2510/0657* (2013.01); *B60W 2510/083* (2013.01); *B60W 2550/143* (2013.01); *B60W 2550/402* (2013.01); *B60W 2710/244* (2013.01); *B60W 2720/103* (2013.01);
(Continued)

(58) Field of Classification Search
CPC ..... B60W 10/06; B60W 10/08; B60W 10/26; B60W 20/00; B60W 10/104
USPC ......................... 701/22; 180/65.265; 903/930
See application file for complete search history.

(56) References Cited

U.S. PATENT DOCUMENTS

| | | | |
|---|---|---|---|
| 6,622,804 B2 * | 9/2003 | Schmitz et al. | 180/65.245 |
| 6,877,576 B2 * | 4/2005 | Wilton et al. | 180/65.245 |

(Continued)

FOREIGN PATENT DOCUMENTS

| | | |
|---|---|---|
| DE | 10 2006 033 930 A1 | 1/2008 |
| DE | 10 2008 023 135 A1 | 11/2009 |

(Continued)

OTHER PUBLICATIONS

International Search Report dated May 7, 2012 with English translation (six (6) pages).

(Continued)

*Primary Examiner* — McDieunel Marc
(74) *Attorney, Agent, or Firm* — Crowell & Moring LLP

(57) ABSTRACT

A hybrid drive control device for a hybrid motor vehicle includes a control or regulation unit having a hybrid operating module that predictively controls or regulates at least a state of charge of an energy store as a function of at least one route parameter. The control or regulation unit has at least one speed control operating module that predictively controls or regulates a motor vehicle speed as a function of the at least one route parameter.

7 Claims, 2 Drawing Sheets

(51) Int. Cl.
*B60W 10/06* (2006.01)
*B60W 10/08* (2006.01)
*B60W 10/26* (2006.01)
*B60W 30/14* (2006.01)

(52) U.S. Cl.
CPC ........ *Y02T 10/6291* (2013.01); *B60W 2600/00* (2013.01); *Y10S 903/93* (2013.01)
USPC .................. 701/22; 180/65.265; 903/930

(56) References Cited

U.S. PATENT DOCUMENTS

| | | | |
|---|---|---|---|
| 6,897,629 B2 * | 5/2005 | Wilton et al. | 318/139 |
| 7,017,542 B2 * | 3/2006 | Wilton et al. | 123/179.3 |
| 7,121,234 B2 * | 10/2006 | Schmitz et al. | 123/41.02 |
| 7,122,979 B2 * | 10/2006 | Wilton et al. | 318/400.09 |
| 7,137,344 B2 * | 11/2006 | Kumar et al. | 105/35 |
| 7,657,350 B2 * | 2/2010 | Moran | 701/22 |
| 7,657,351 B2 * | 2/2010 | Moran | 701/22 |
| 7,680,568 B2 * | 3/2010 | Moran | 701/22 |
| 7,689,330 B2 * | 3/2010 | Moran | 701/22 |
| 7,689,331 B2 * | 3/2010 | Moran | 701/22 |
| 8,543,273 B2 * | 9/2013 | Pfefferl | 701/22 |
| 2007/0112475 A1 | 5/2007 | Koebler et al. | |
| 2009/0259354 A1 | 10/2009 | Krupadanam et al. | |
| 2010/0204896 A1 | 8/2010 | Biondo et al. | |
| 2011/0054768 A1 | 3/2011 | Sullivan | |

FOREIGN PATENT DOCUMENTS

| | | |
|---|---|---|
| DE | 10 2008 025 852 A1 | 12/2009 |
| WO | WO 2009/106852 A1 | 9/2009 |
| WO | WO 2010/058267 A1 | 5/2010 |
| WO | WO 2011/025443 A1 | 3/2011 |

OTHER PUBLICATIONS

German-language Written Opinion dated May 7, 2012 (eight (8) pages).
Japanese Office Action dated Oct. 21, 2014 with English-language translation (Four Pages).

* cited by examiner

HYBRID DRIVE CONTROL DEVICE

BACKGROUND AND SUMMARY OF THE INVENTION

Exemplary embodiments of the present invention relate to a hybrid drive control device.

German patent document DE 10 2006 033 930 A1 discloses a hybrid drive control device for a hybrid motor vehicle having a control and/or regulation unit having a hybrid operating module that is provided for predictively controlling and/or regulating at least a state of charge of an energy store as a function of at least one route parameter.

Exemplary embodiments of the present invention are directed to reduction of fuel consumption of a hybrid motor vehicle which has the hybrid drive control device.

The invention is directed to a hybrid drive control device, in particular for a hybrid motor vehicle, having a control and/or regulation unit which has a hybrid operating module that is provided for predictively controlling and/or regulating at least a state of charge of an energy store as a function of at least one route parameter.

The control and/or regulation unit has at least one speed control operating module provided for predictively controlling and/or regulating a motor vehicle speed as a function of the at least one route parameter. The speed control operating module takes functional precedence over the hybrid operating module.

This allows us of kinetic energy for optimizing a control and/or regulation of a hybrid drive train of the hybrid motor vehicle so that effectiveness may be improved. Efficiency may thus be improved, thereby increasing a savings potential by the hybrid motor vehicle and thus making it possible to reduce fuel consumption of the hybrid motor vehicle which has the hybrid drive control device. In particular, a higher priority may be assigned to the speed control operating module compared to the hybrid operating module, so that the fuel consumption may be further reduced. A "hybrid drive control device" should be understood to mean a device provided for controlling and/or regulating a hybrid drive train of the hybrid motor vehicle. A "hybrid motor vehicle" should be understood to mean a motor vehicle having a hybrid drive unit having least one first drive machine and at least one second drive machine, wherein the at least one first drive machine and the at least one second drive machine, either individually or in combination, drive drive wheels, in particular at least one of the drive machines being designed as an engine-generator unit. An "energy store unit" should be understood to mean a unit provided for storing drive energy and for delivering the stored drive energy in order to drive at least one of the drive machines or the final drive elements, for example wheels. An "engine-generator unit" should be understood to mean an electric machine, such as an engine or a generator or a mechanical combination of both, which is able to deliver a positive mechanical drive force or a torque, and to act as an electrical generator at other times.

A "control and/or regulation unit" should be understood to mean a unit having at least one control device and/or one operating module. A "control device" should be understood to mean a unit having a processor unit and a memory unit, as well as an operating program that is stored in the memory unit. An "operating module" should be understood to mean a function and/or an operating program implemented in a separate unit and/or in a control device. In principle, the control and/or regulation unit may have multiple interconnected control devices and/or operating modules that are preferably provided for communicating with one another via a bus system, such as a CAN bus system. A "hybrid operating module" should be understood to mean an operating module that automatically sets a torque distribution between the first drive machine and the second drive machine, in particular to optimize a state of charge (SOC) of the energy store and/or fuel consumption. A "speed control operating module" should be understood to mean an operating module that automatically sets a transmission gear speed, preferably of an automatic transmission of the hybrid motor vehicle, and/or an overall required braking torque, in particular a hybrid braking torque, and/or a drive torque, in particular a hybrid drive torque, in order to optimize a motor vehicle speed in particular with regard to the fuel consumption. The term "optimize" should be understood to mean to adjust and/or set, for example with regard to efficiency, a component and/or a unit and/or a process and/or a property of the component and/or of the unit and/or of the process in the best possible way by means of at least one setting parameter. An "overall braking torque" should be understood to mean a sum of braking torques of all units that are provided for supplying a braking torque, such as drive machines, sustained-action brakes, service brakes, and/or similar units. A "hybrid braking torque" should be understood to mean a braking torque of one of the drive machines of the hybrid drive unit, in particular of a drive machine designed as an electric motor, which thus preferably recovers energy, such as recuperation. An "overall hybrid braking torque" should be understood to mean a sum of braking torques of the hybrid drive unit. A "hybrid drive torque" should be understood to mean a drive torque provided by the hybrid drive unit. A "route parameter" should be understood to mean a parameter describing a course, in particular a course of an altitude, preferably of an upcoming route, such as curves, slopes, and/or the like. The term "predictively" should be understood to mean as a function of future, upcoming route parameters. The term "takes functional precedence over" should be understood to mean that the speed control operating module has a higher priority than the hybrid operating module, and/or that an operating strategy of the speed control operating module is preferred over an operating strategy of the hybrid operating module. The term "provided" should be understood to mean specially programmed, designed, and/or equipped.

Furthermore, the speed control operating module and the hybrid operating module are communicatively connected with one another. A particularly advantageous dependency between the speed control operating module and the hybrid operating module may thus be achieved.

Additionally, the control and/or regulation unit can utilize kinetic energy by means of the speed control operating module. The kinetic energy may thus be utilized in a particularly simple manner in order to reduce fuel consumption. The term "utilizing kinetic energy by means of the speed control operating module" should be understood to mean that the kinetic energy is utilized via a change in the motor vehicle speed, the kinetic energy preferably being decreased and once again built up, and/or built up and once again decreased.

Moreover, the hybrid operating module can predictively control and/or regulate at least the state of charge of the energy store as a function of the speed control operating module. Particularly advantageous control and/or regulation of at least the state of charge of the energy store may be achieved in this way.

It is particularly advantageous when the control and/or regulation unit is provided for setting, prior to downhill travel, by means of the speed control operating module a hybrid drive torque that is provided for passively reducing the motor vehicle speed. The kinetic energy may thus be advantageously decreased so that a route, in particular having a positive slope and/or a flat distance, may be traversed in a fuel-saving manner. The term "downhill travel" should be understood to mean a distance having a negative slope and/or a position of a traveling hybrid motor vehicle which is situated between two local extreme values of the distance, a driving direction of the hybrid motor vehicle pointing from a local high point to a local low point. The term "prior to downhill travel" should be understood to mean that directly after an instantaneous distance range, a route range follows that has a negative slope or a larger value of a negative slope compared to the instantaneous distance range. The term "instantaneous distance range" should be understood to mean a distance range on which the hybrid motor vehicle is present at that moment. A "passive reduction" should be understood to mean that the motor vehicle speed is reduced due to the absence of an additional hybrid drive torque. An "additional hybrid drive torque" should be understood to mean a hybrid drive torque provided to compensate for at least one force acting opposite a driving direction of the hybrid motor vehicle during travel in order to keep a motor vehicle speed constant. In particular, this term should be understood to mean a difference between a hybrid drive torque that is set for an instantaneous motor vehicle speed and a hybrid drive torque that is required in order to continuously travel in a plane at the instantaneous motor vehicle speed. The force acting opposite a driving direction is preferably formed as a friction, an air resistance, a grade resistance force that occurs during uphill travel, and/or as similar forces or losses. The term "uphill travel" should be understood to mean a distance having a positive uphill slope and/or a position of a traveling hybrid motor vehicle that is situated between two local extreme values of the distance, a driving direction of the hybrid motor vehicle pointing from a local low point to a local high point. The term "hybrid drive torque provided for reducing the motor vehicle speed" should be understood to mean a hybrid drive torque which is greater than or equal to zero and which results in a reduction in the motor vehicle speed.

It is also advantageous when, during uphill travel, the control and/or regulation unit is designed to set by means of the speed control operating module a hybrid drive torque which is provided for passively reducing the motor vehicle speed. The kinetic energy may thus be decreased in a particularly advantageous manner for utilizing the savings potential.

It is also advantageous when the control and/or regulation unit is designed to set, during downhill travel, by means of the speed control operating module a braking torque which is provided for passively increasing the motor vehicle speed. The kinetic energy may thus be advantageously built up so that a negative slope of a distance may be traversed in a fuel-saving manner. The term "passive increase" should be understood to mean that the motor vehicle speed increases due to external circumstances, such as the grade resistance force in particular, without use of an additional hybrid drive torque. The term "braking torque which is provided for increasing the motor vehicle speed" should be understood to mean a braking torque which is greater than or equal to zero and which results in an increase in the motor vehicle speed.

In addition, a method is proposed for controlling and/or regulating a hybrid motor vehicle by means of a hybrid drive control device, in particular a hybrid drive control device according to the invention, which predictively controls and/or regulates at least a state of charge of an energy store as a function of at least one route parameter, the hybrid drive control device predictively controlling and/or regulating a motor vehicle speed as a function of the at least one route parameter. The hybrid drive control device preferentially controls and/or regulates the motor vehicle speed with regard to a control and/or regulation of at least the state of charge of the energy store. A method for controlling and/or regulating the hybrid motor vehicle may thus be provided by means of which efficiency and/or fuel savings of the hybrid motor vehicle may be improved.

In addition, for the method it is proposed that the hybrid drive control device predictively controls and/or regulates at least the state of charge of the energy store as a function of a control and/or regulation of the motor vehicle speed. The control and/or regulation of the state of charge and the control and/or regulation of the motor vehicle speed may thus be combined with one another in a particularly efficient and fuel-saving manner.

Further advantages result from the following description of the drawings. One exemplary embodiment of the invention is illustrated in the drawings. The drawings, the description, and the claims contain numerous features in combination. Those skilled in the art will also advantageously consider the features individually and combine them into further meaningful combinations.

BRIEF DESCRIPTION OF THE DRAWING FIGURES

The figures show the following:

DETAILED DESCRIPTION

Figure 1:
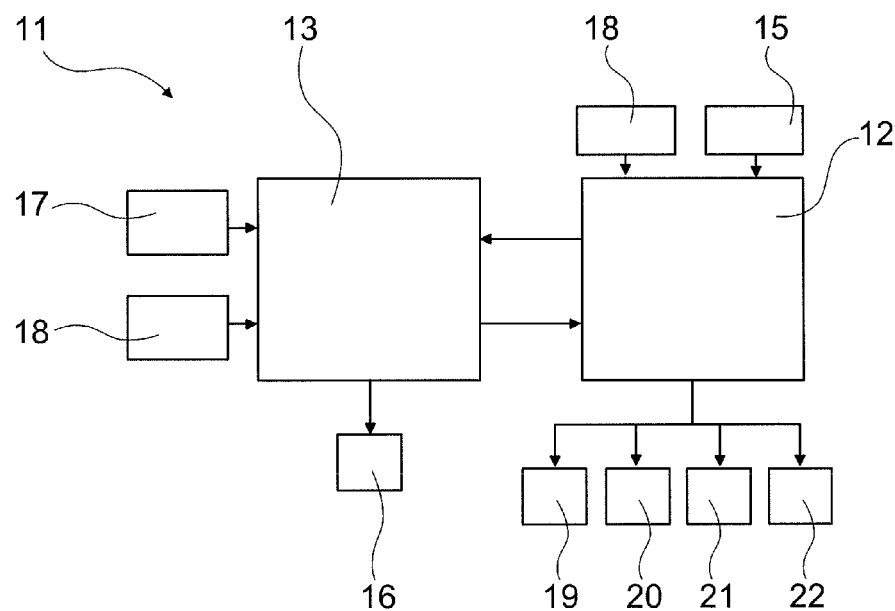
FIG. 1 shows a control and regulation unit of a hybrid drive control device.

FIG. 1 schematically shows a portion of a hybrid drive control device for a hybrid motor vehicle 10. In addition, FIGS. 2 and 3 each show an example of control and regulation of the hybrid motor vehicle 10. The hybrid drive control device is provided for controlling and regulating a hybrid drive train of the hybrid motor vehicle 10. The hybrid drive train of the hybrid motor vehicle 10 has a hybrid drive unit that includes an electric motor and an internal combustion engine. The hybrid motor vehicle 10 is designed as a hybrid utility vehicle, specifically, as a hybrid truck. In principle, the hybrid motor vehicle 10 may also be designed as a hybrid passenger vehicle.

The hybrid drive control device has a control and regulation unit 11 for controlling and regulating the hybrid motor vehicle 10, and which includes a predictive hybrid operating module 12, i.e., which predictively controls and regulates a state of charge of an electrical energy store of the hybrid drive train as a function of route parameters. The hybrid operating module 12 determines a predictive operating strategy of the hybrid drive unit, using the route parameters. For this purpose, the hybrid operating module 12 determines an optimal change in the state of charge of the energy store over time, using energy store data, and on this basis controls and regulates a torque distribution between the internal combustion engine and the electric motor of the hybrid drive unit. In order to use the energy store data, the hybrid operating module 12 is in communicating connection with an energy store data module 15 of the control and regulation unit 11. The energy store data module 15 supplies all state data of the energy store, for example the state of charge (SOC), an energy store temperature, an allowed charging and discharging power of the energy store, and/or the like. The energy store is designed as a battery, specifically, as a high-voltage battery.

In addition, the control and regulation unit 11 has a predictive speed control operating module 13, i.e., which predictively controls and regulates a motor vehicle speed 14 of the hybrid motor vehicle 10 as a function of the route parameters. The speed control operating module 13 determines or computes, using the route parameters, a consumption-optimized default for a gear selection of an automatic transmission of the hybrid drive train, as well as a consumption-optimized default for an overall required hybrid drive torque or an overall required hybrid braking torque of the hybrid drive unit. The speed control operating module predictively determines a required torque of the hybrid drive unit as a function of the route parameters. The speed control operating module 13 controls and regulates the motor vehicle speed 14, taking into account a present hybrid motor vehicle position, an upcoming terrain profile, and a traffic volume, whereby use is made of coasting phases after roadway hilltops and on downhill slopes to increase the motor vehicle speed 14 of the hybrid motor vehicle 10 with little or no addition of a hybrid drive torque. This type of module is referred to as an integrated predictive powertrain control (IPPC) system. The speed control operating module 13 is in communicating connection with a gear selection module 16 in order to coordinate the default for the gear selection. The gear selection module 16 is provided for setting the transmission gear specified by the speed control operating module 13.

Prior to an upcoming downhill travel, and thus prior to an upcoming negative slope of the distance, the control and regulation unit 11 sets by means of the speed control operating module 13 a hybrid drive torque which is provided for passively reducing the motor vehicle speed 14. Prior to an upcoming downhill travel, the control and regulation unit reduces the hybrid drive torque early or predictively by means of the speed control operating module 13. As a result of the hybrid drive torque that is set by means of the speed control operating module 13, the motor vehicle speed 14 is passively reduced due to losses, for example due to a rolling resistance of drive wheels, an air resistance, a grade resistance force, and/or the like. For passively reducing the motor vehicle speed 14 prior to an upcoming downhill travel, the control and regulation unit 11 reduces the hybrid drive torque by means of the speed control operating module 13. For passively reducing the motor vehicle speed 14 the control and regulation unit 11, by means of the speed control operating module 13, sets a hybrid drive torque that is less than a hybrid drive torque that must be applied in order to keep the motor vehicle speed 14 constant over the distance which the hybrid motor vehicle 10 is instantaneously traveling.

During downhill travel, and thus during a negative slope of the distance, directly after a negotiated uphill travel or directly after a negotiated flat distance prior to an upcoming local low point, for passively increasing the motor vehicle speed 14 the control and regulation unit 11 sets, by means of the speed control operating module 13, a braking torque that is provided by the hybrid drive unit and/or by the sustained-action brakes. By means of the speed control operating module 13, the control and regulation unit 11 delays or prevents generation of a braking torque during the downhill travel. The local low point may be followed by an at least essentially flat distance or a distance having a positive slope, and thus an uphill travel. To passively increase the motor vehicle speed 14 the control and regulation unit 11, by means of the speed control operating module 13, sets a braking torque that is less than a braking torque that keeps the motor vehicle speed 14 constant or reduces same. The motor vehicle speed 14 is passively increased due to the braking torque which is set by means of the speed control operating module 13. For passively increasing the motor vehicle speed 14 during the downhill travel, the control and regulation unit 11 sets a braking torque of zero by means of the speed control operating module 13, and allows the hybrid motor vehicle 10 to coast. The control and regulation unit 11 delays or prevents recuperation of the energy store due to the speed control operating module 13 taking precedence over the hybrid operating module 12. For passively increasing the motor vehicle speed 14, the control and regulation unit delays or prevents recuperation by means of the speed control operating module 13. The control and regulation unit 11 thus preferentially makes use of a savings potential of the kinetic energy over a savings potential of electrical energy. The control and regulation unit 11 takes advantage of the remaining savings potential by means of the hybrid operating module 12, which takes less precedence. In principle, for passively increasing the motor vehicle speed 14 during the downhill travel, the control and regulation unit 11 may set a braking torque of greater than zero.

The speed control operating module 13 and the hybrid operating module 12 are in communicating connection with one another. The speed control operating module 13 takes functional precedence over the hybrid operating module 12, i.e., has priority over the hybrid operating module 12. With regard to the control and regulation of the state of charge of the energy store by means of the hybrid operating module 12, the hybrid drive control device preferentially controls and regulates the motor vehicle speed 14 by means of the speed control operating module 13. The control and regulation unit 11 preferentially makes use of kinetic energy of the hybrid motor vehicle 10 by means of the speed control operating module 13 before making use of the electrical energy store. In principle, the hybrid drive train of the hybrid motor vehicle 10 may additionally or alternatively have a kinetic energy store which is preferentially utilized prior to utilization of the electrical energy store. The kinetic energy store is designed as a flywheel, for example.

The hybrid operating module 12 of the hybrid drive control device predictively controls and regulates the state of charge of the electrical energy store as a function of the speed control operating module 13. The hybrid drive control device predictively controls and regulates the state of charge of the energy store as a function of the control and regulation of the motor vehicle speed 14. The hybrid operating module 12 determines the predictive operating strategy of the hybrid drive unit, using the required hybrid drive torque determined by the speed control operating module 13, and thus as a function of the route parameters, and determines the required hybrid braking torque. Due to the communicating connection of the speed control operating module 13 with the hybrid operating module 12, the hybrid operating module 12 supplies possible feedback information concerning the operating strategy of the hybrid drive unit, for example when a downshifting operation during uphill travel may be delayed or prevented by additional boosting of the electric motor, or if coasting with assistance from the electric motor would be possible and meaningful.

The control and regulation unit 11 has a predictive module 17 for providing and thus for determining the future route parameters. The predictive module 17 determines an instantaneous hybrid motor vehicle position with the aid of GPS or other classical navigation functions. The predictive module 17 either computes the most likely distance path for determining the future route parameters, or the predictive module 17 specifies the future route parameters based on destination and starting coordinates entered using a navigation unit. The route parameters describe an elevation profile of the upcoming distance. The route parameters are provided as slopes of the distance ahead of the hybrid motor vehicle. The predictive module 17 is in communicating connection with the speed control operating module 13.

The control and regulation unit 11 has an operating data module 18 for providing further relevant instantaneous state variables. The operating data module 18 supplies requests of a driver of the hybrid motor vehicle 10, for example a gas pedal position, data from the internal combustion engine, data from the electric motor, data from the transmission such as the actual instantaneous transmission gear, temperatures and/or the like, and driving data such as the motor vehicle speed 14. The operating data module 18 is in communicating connection with the speed control operating module 13 and with the hybrid operating module 12.

For controlling and regulating the torque distribution in the hybrid drive unit, the control and regulation unit 11 has a torque default module 19 for the internal combustion engine and a torque default module 20 for the electric motor. The torque default module 19 for the internal combustion engine and the torque default module 20 for the electric motor are each in communicating connection with the hybrid operating module 12. The torque default module 19 coordinates the default of the speed control operating module 13 for the required torque in the direction of the internal combustion engine. The torque default module 20 coordinates the default of the speed control operating module 13 for the required torque in the direction of the electric motor.

If a hybrid braking torque due to the electric motor is not sufficient, the hybrid operating module 12 controls and regulates sustained-action brakes of the hybrid drive train. For this purpose, the hybrid operating module 12 is in communicating connection with a torque default module 21 of the control and regulation unit 11. The torque default module 21 is provided for the sustained-action brakes. The torque default module coordinates the default of the speed control operating module 13 for the required torque in the direction of sustained-action brakes, using a brake management system. The sustained-action brakes are designed as retarders. Of course, the sustained-action brakes may also be designed as other sustained-action brakes which are considered meaningful by those skilled in the art.

The hybrid drive train of the hybrid motor vehicle 10 also has a waste heat system that electrically delivers braking energy of the sustained-action brakes into a high-voltage intermediate circuit. For this purpose, the hybrid operating module 12 is in communicating connection with a torque default module 22 of the control and regulation unit 11. The torque default module 22 is provided for the waste heat system, and coordinates a quantity of energy delivered by a generator of the waste heat system into the high-voltage intermediate circuit. In principle, the waste heat system may also be dispensed with.

Figure 2:
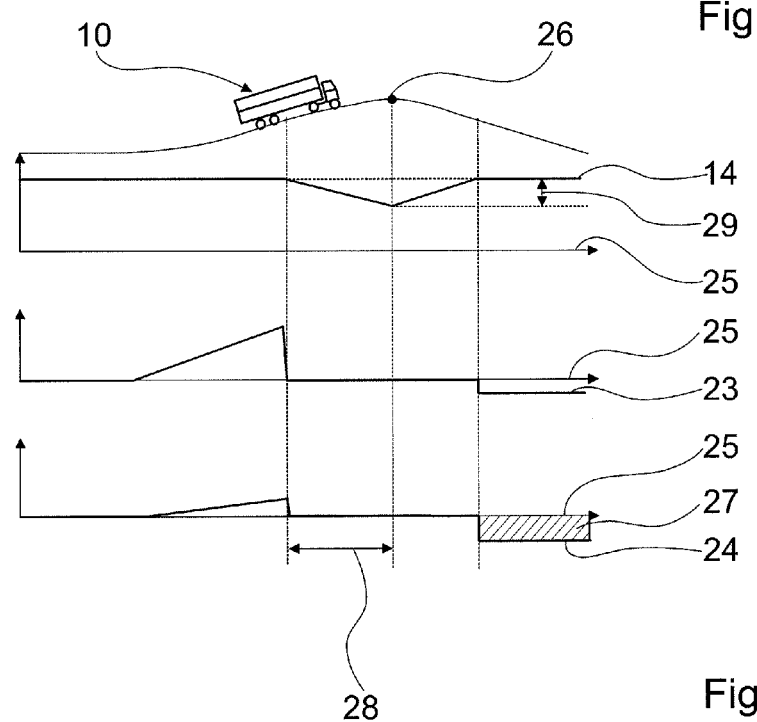
FIG. 2 shows a control and regulation of a hybrid motor vehicle having the hybrid drive control device, during negotiation of a hilltop.
Figure 3:
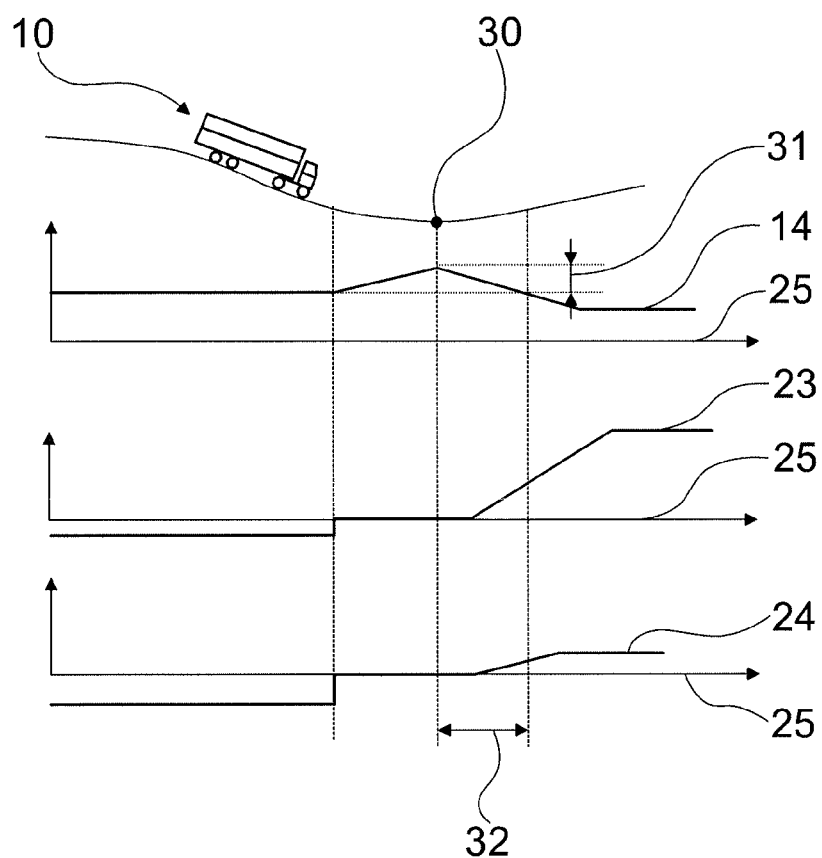
FIG. 3 shows the control and regulation of the hybrid motor vehicle during negotiation of a valley.

The control and regulation of the hybrid motor vehicle 10 using the hybrid drive control device is explained below for traversal of a hilltop and for traversal of a valley (see FIG. 2 and FIG. 3, respectively). The motor vehicle speed 14, an internal combustion engine torque 23, and an electric motor torque 24 are plotted as a function of a path 25 of the distance in both FIGS. 2 and 3.

By means of the speed control operating module 13, the control and regulation unit 11 slightly reduces the motor vehicle speed 14 during negotiation of the hilltop (see FIG. 2) prior to a local high point 26, i.e., during uphill travel, and for negotiating the high point 26 consumes the kinetic energy of the hybrid motor vehicle 10 in order to increase the kinetic energy of the hybrid motor vehicle 10 after the high point 26, and thus in the subsequent downhill travel, due to a grade resistance force without using an additional hybrid drive torque. For passively reducing the motor vehicle speed 14, during the uphill travel the control and regulation unit 11 sets a hybrid drive torque, by means of the speed control operating module 13, which is less than a hybrid drive torque that is present prior to the uphill travel, and which is thus present on an at least essentially flat distance, and which is provided for keeping the motor vehicle speed 14 constant on the flat distance. For negotiating the hilltop, the control and regulation unit sets a negative difference 29 from the motor vehicle speed 14. For this purpose, the control and regulation unit 11 reduces the internal combustion engine torque 23 and the electric motor torque 24 prior to the high point 26 by means of the speed control operating module 13. The control and regulation unit sets an internal combustion engine torque 23 and an electric motor torque 24 that were present prior to the uphill travel. After the high point 26, the control and regulation unit 11 sets a braking torque of zero in order to effectively increase the kinetic energy. By means of the hybrid operating module 12, the control and regulation unit 11 sets a braking torque of greater than zero, and thus a recuperation torque, only after the hybrid motor vehicle 10 has reached a desired motor vehicle speed 14 due to the grade resistance force, and thus when the desired kinetic energy is present, as the result of which recuperation 27 of the energy store takes place. In comparison to a hybrid operating module 12 that takes precedence, the recuperation 27 of the energy store is reduced due to the speed control operating module 13 taking precedence. A savings effect 28 results from an early removal or reduction of the hybrid drive torque prior to the high point 26 during the uphill travel. In principle, for passively reducing the motor vehicle speed 14 the control and regulation unit 11 may also keep the hybrid drive torque constant during the uphill travel in relation to the hybrid drive torque prior to the uphill travel, or may set a hybrid drive torque of zero. When the hybrid motor vehicle 10 is traveling on a flat distance toward a downhill slope, i.e., when the hybrid motor vehicle 10 is traveling on a flat distance prior to upcoming downhill travel, the control and regulation unit 11 analogously reduces the motor vehicle speed 14 by means of the speed control operating module 13, and for negotiating the flat distance prior to the downhill travel, consumes the kinetic energy of the hybrid motor vehicle 10 in order to increase the kinetic energy of the hybrid motor vehicle 10 in the subsequent downhill travel due to a grade resistance force, without using an additional hybrid drive torque.

By means of the speed control operating module 13, during negotiation of the valley (see FIG. 3) the control and regulation unit 11 slightly increases the motor vehicle speed 14 prior to a local low point 30, i.e., during the downhill travel, and for traversing the low point 30 therefore increases the kinetic energy of the hybrid vehicle 10 in order to reduce or consume the kinetic energy of the hybrid motor vehicle 10 after the low point 30, and thus in the subsequent uphill travel, due to the grade resistance force. For traversing the valley, the control and regulation unit sets a positive difference 31 from the motor vehicle speed 14. For this purpose, by means of the speed control operating module 13, the control and regulation unit 11 reduces the braking torque prior to the low point 30. The control and regulation unit reduces the hybrid braking torque of the hybrid drive unit, and thus, a negative internal combustion engine torque 23 and a negative electric motor torque 24. The control and regulation unit 11 sets a braking torque of zero by means of the speed control operating module 13. The speed control operating module 13, which takes precedence, prevents the recuperation 27 of the energy store. For traversing the valley, the control and regulation unit 11 builds momentum prior to the low point 30 and prevents a recuperation torque. A savings effect 32 results from an early removal or reduction of the braking torque prior to the low point 30 during the downhill travel, resulting in a build-up of momentum of the hybrid motor vehicle 10 which is then utilized in the subsequent uphill travel. Of course, the low point 30 may also be followed by a flat distance in which the kinetic energy that was increased during the downhill travel is once again decreased, so that the hybrid drive torque must therefore be applied in a delayed manner.

By means of the predictive module 17, the control and regulation unit 11 recognizes further distance segments that are ideal for coasting. Coasting allows a build-up of momentum without drag torques on the internal combustion engine. If the control and regulation unit 11 recognizes such distance segments, it preferentially makes use of these for coasting of the hybrid motor vehicle 10, and thus preferentially makes use of the kinetic energy by means of the speed control operating module 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A hybrid drive control device for a hybrid motor vehicle, the hybrid control device comprising:
   a control or regulation unit, comprising
      a hybrid operating module configured to predictively control or regulate at least a state of charge of an energy store as a function of at least one route parameter of the hybrid motor vehicle; and
      a speed control operating module configured to predictively control or regulating a motor vehicle speed of the hybrid motor vehicle as a function of the at least one route parameter,
   wherein the hybrid control device is configured so that the speed control operating module takes functional precedence over the hybrid operating module so that the motor vehicle speed is controlled or regulated regardless of a state of charge of the energy store,
   wherein the speed control operating module and the hybrid operating module are communicatively coupled with one another.

2. The hybrid drive control device according to claim 1, wherein the control or regulation unit is configured to utilize kinetic energy using the speed control operating module.

3. The hybrid drive control device according to claim 1, wherein the hybrid operating module is configured to predictively control or regulate at least the state of charge of the energy store as a function of the speed control operating module.

4. The hybrid drive control device according to claim 1, wherein the control or regulation unit is configured to set, using the speed control operating module, a hybrid drive torque that passively reduce the motor vehicle speed prior to downhill travel.

5. The hybrid drive control device according to claim 1, wherein the control or regulation unit is configured to set, using the speed control operating module, a braking torque that passively increases the motor vehicle speed during downhill travel.

6. A method, comprising:
   controlling or regulating a hybrid motor vehicle using a hybrid drive control device that predictively controls or regulates at least a state of charge of an energy store as a function of at least one route parameter,
   wherein the hybrid drive control device predictively controls or regulates a motor vehicle speed of the hybrid motor vehicle as a function of the at least one route parameter, and controls or regulates the motor vehicle speed of the hybrid motor vehicle with regard to a control or regulation of at least the state of charge of the energy store, and
   wherein the hybrid drive control device controls or regulates the motor vehicle speed based on the at least one route parameter so that a savings potential of kinetic energy is given precedence over a savings potential of electrical energy.

7. The method according to claim 6, wherein the hybrid drive control device predictively controls or regulates at least the state of charge of the energy store as a function of a control or regulation of the motor vehicle speed.

\* \* \* \* \*